United States Patent
Vendrow et al.

(10) Patent No.: US 8,644,485 B1
(45) Date of Patent: Feb. 4, 2014

(54) INTELLIGENT SOFTSWITCH FOR MANAGING A CALL

(75) Inventors: Vlad Vendrow, Redwood Shores, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 259 days.

(21) Appl. No.: 12/939,916

(22) Filed: Nov. 4, 2010

Related U.S. Application Data

(60) Provisional application No. 61/260,381, filed on Nov. 11, 2009.

(51) Int. Cl.
*H04M 3/42* (2006.01)

(52) U.S. Cl.
USPC .................................................. 379/211.02

(58) Field of Classification Search
USPC ............... 379/88.13, 93.07, 93.09, 201.01, 379/201.03, 211.01, 211.02, 211.03, 379/211.04, 212.01; 370/352; 455/461
See application file for complete search history.

(56) References Cited

U.S. PATENT DOCUMENTS

| | | | |
|---|---|---|---|
| 7,068,668 B2 | 6/2006 | Feuer | |
| 7,486,667 B2 | 2/2009 | Feuer | |
| 2003/0142807 A1* | 7/2003 | Dolan et al. | 379/211.02 |
| 2005/0129206 A1* | 6/2005 | Martin | 379/211.01 |
| 2005/0163108 A1* | 7/2005 | Moore et al. | 370/352 |
| 2009/0129566 A1 | 5/2009 | Feuer et al. | |

* cited by examiner

*Primary Examiner* — Antim Shah
(74) *Attorney, Agent, or Firm* — Fish & Richardson P.C.

(57) ABSTRACT

Systems, methods and computer program products for managing a call are described. In some implementations, an intelligent softswitch can be used to communicate with a provider system that can relay or switch one or more outbound calls initiated by a caller and intended for a subscriber to the intelligent softswitch. Upon receiving the relayed call, the intelligent softswitch can process the relayed call using one or more call handling rules that have been specified by the subscriber. After processing, the relayed call is routed back to the provider system for completing the call.

26 Claims, 4 Drawing Sheets

INTELLIGENT SOFTSWITCH FOR MANAGING A CALL

CROSS-REFERENCE TO RELATED APPLICATIONS

This application claims priority to U.S. Provisional Application Ser. No. 61/260,381, filed on Nov. 11, 2009. The disclosure of the prior application is considered part of and is incorporated by reference in the disclosure of this application.

TECHNICAL FIELD

This subject matter relates to managing communications for devices.

BACKGROUND

Telecommunications is becoming increasingly important in today's society. Telecommunications systems allow users located at great distances to communicate with one another. A conventional telephone call requires a connection between the devices (e.g., land or mobile telephones) used by the caller and the called party. Such connections were traditionally formed by creating a physical connection by physically closing a plurality of switches to complete a circuit between the two telephones. Physical switches have been replaced with computer software and other "softswitch" technology. Softswitches can be used to perform the necessary switching of calls through a network, thereby eliminating the need for certain hardware and reducing the cost associated with establishing calls between individuals.

SUMMARY

Systems, methods and computer program products for managing a call are described. In some implementations, an intelligent softswitch can be used to communicate with a provider system that can relay or switch one or more outbound calls initiated by a caller and intended for a subscriber to the intelligent softswitch. Upon receiving the relayed call, the intelligent softswitch can process the relayed call using one or more call handling rules that have been specified by the subscriber. After processing, the relayed call is routed back to the provider system for completing the call.

In some implementations, a method can be used that includes receiving a relayed call from a provider system including call information associated with the call; identifying a subscriber based on the call information; identifying one or more configuration parameters associated with the subscriber; and processing the relayed call based on the one or more identified configuration parameters including routing the relayed call back to the provider system for completing the relayed call.

In some implementations, a system can be used that includes a database for storing one or more configuration profiles; and a call control manager for receiving a relayed call from a provider system, the call control manager including a softswitch operable to: identify call information associated with the relayed call; identify a subscriber based on the call information; identify a configuration profile associated with the subscriber; process the relayed call in accordance with the configuration profile; and route the relayed call back to the provider system for completing the relayed call.

In some implementations, a device can be used that includes a softswitch operable to: receive a relayed call from a third party device; identify call information associated with the relayed call; identify a subscriber based on the call information; identify a configuration profile associated with the subscriber; process the relayed call in accordance with the configuration profile; and route the relayed call back to the third party device for completing the relayed call.

The details of one or more implementations are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

Figure 1:
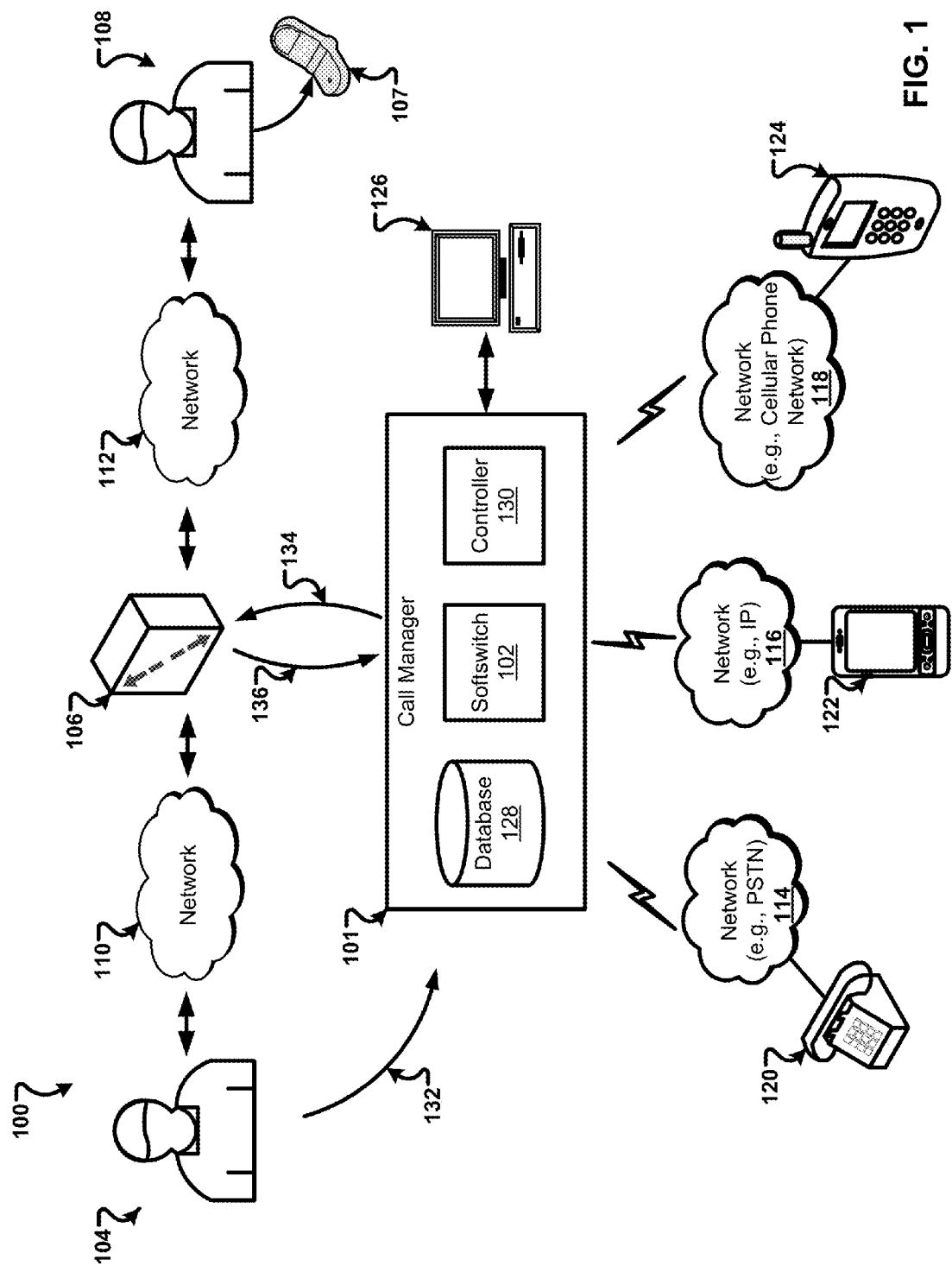
FIG. 1 illustrates an example of a telecommunication network.

FIG. 1 illustrates an example of a telecommunication network 100. As shown in FIG. 1, the telecommunication network 100 can include an intelligent softswitch 102. The intelligent softswitch 102 can provide necessary routing or switching of an outbound call (e.g., using software, hardware, or combination thereof) and can be designed to accommodate any desired type of telecommunications protocol, as will be discussed in greater detail below.

The intelligent softswitch 102 can be configured to communicate with one or more communication devices using one or more modes of communication. Examples of such modes of communication can include, without limitation, public branch exchange ("PBX"), public switched telephone network ("PSTN") phone technologies, cellular/wireless telephone technologies/standards, such as global system for mobile communications ("GSM"), frequency division multiple access ("FDMA"), time division multiple access ("TDMA"), code division multiple access ("CDMA"), other communications protocols such as session initiation protocol ("SIP") and the like.

The intelligent softswitch 102, in some implementations, can communicate with a provider system 106 that can relay or switch one or more outbound calls initiated by a caller 104 and intended for the subscriber 108 to the intelligent softswitch 102 (e.g., via link 136). The caller 104 can initiate a call request to place the call using, for example, a communications device (e.g., a mobile device), and the communications device can be configured to interact with the provider system 106 over a communications network 110 (e.g., a telecom network). The communications device also can include an interface for facilitating generation, receipt, processing, and management of call control data for delivery over the communications network 110. Where the communications device used by the caller 104 includes an interface, the interface can be configured to implement various functionalities, including displaying outbound calls, dialing outbound calls, and other functionalities.

As shown in FIG. 1, calls or call requests originating from the caller 104 can first be relayed to the provider system 106 over the network 110. Depending on the type of the communications device used by the caller 104, the network 110 used to facilitate the connection of the call of the caller 104 can be different. For example, where the caller 104 places a call to the subscriber 108 using an analog phone, the network 110 can be a PSTN connected to the provider system 106 and/or other interconnected switches (e.g., third-party switches, external switches, and the like). Where an analog phone is used to place the call by the caller 104, the provider system 106 can provide the necessary conversion (e.g., converting between analog data used by the analog phone and digital data used internally by the provider system 106) that is suitable for processing by the intelligent softswitch 102 (or receipt by the subscriber 108 at any one of the communications devices 120-124 or the user terminal 126).

An outbound call from the caller 104 can be received by the provider system 106 (which can detect the dialed number and establish the call), and can be relayed along with the dialed number or any other called information associated with the call or the caller to the intelligent softswitch 102. The dialed number can be served by the provider system 106 and assigned to a receiving device 107 associated with the subscriber 108.

In some implementations, the intelligent softswitch 102 can be formed as part of a call manager 101 in a virtual PBX system, and the provider system 106 can be connected to the call manager 101 to which calls intended for the subscriber 108 are relayed. In some implementations, the call manager 101 can provide, for example, switching, signaling, analog-to-digital conversion functions or other functions for facilitating calls intended for the subscriber 108 from various types of devices.

Although not shown, the intelligent softswitch 102 also can be coupled to one or more wireless base stations utilizing GSM, W-CDMA, W-TDMA, and/or 3G/GPRS technology. Also, while only one intelligent softswitch 102 is shown, more than one intelligent softswitch 102 also is contemplated.

In general, the intelligent softswitch 102 can provide core call processing and routing for the telecommunication network 100. The intelligent softswitch 102 can process multiple types of calls including calls originating from or terminating at off-network or on-network devices. The intelligent softswitch 102 also can receive messages (e.g., SMS or MMS messages) from and send messages to various callers and subscribers.

The intelligent softswitch 102 can be configured to permit switching of outbound calls placed by the caller 104. For example, the intelligent softswitch 102 can receive an outbound call from the caller 104 (e.g., via the provider system 106), and dynamically process and switch the outbound call based on one or more existing forwarding rules specified by the subscriber 108 (as will be discussed in greater detail below). As an example, the intelligent softswitch 102 can forward the outbound call to one or more of the communications devices 120-124 associated with the subscriber 108 through the PSTN 114 (e.g., to a PSTN communications device 120), the internet protocol ("IP") network 116 (e.g., to an IP communications device 122) or the cellular phone network 118 (e.g., to a mobile device 124). As yet another example, calls which either originate off-network or terminate off-network can be carried over the PSTN 114 to the PSTN communications device 120. Similarly, calls which both originate on-network and terminate on-network can be carried over the IP network 116 or to the user terminal 126.

In addition to the communications devices 120-124, the intelligent softswitch 102 also can provide switching and other services to SIP/H.323 devices, media gateways, base stations, and other network devices. Such services can include, but are not limited to, phone-to-phone, phone-to-PC, fax-to-e-mail, e-mail-to-fax, fax-to-fax, call center applications, VPN, IP phone, and the like. The intelligent softswitch 102 can convert various media (e.g., voice, video, audio, fax and the like) provided in one type of network to a format suitable for another type of network. The intelligent softswitch 102 also can facilitate calls originated from one type of network to a same or different type of network. For example, the intelligent softswitch 102 can terminate bearer channels from a switched circuit network (e.g., signaling system 7 ("SS7")), and allow SIP/H.323 devices to place calls to or receive calls from other SIP/H.323 devices via the intelligent softswitch 102. As another example, SIP/H.323 devices can place calls to or receive calls from devices connected to the PSTN 114 using the intelligent softswitch 102. As yet another example, SIP/H.323 devices can place calls to or receive calls from wireless phones (e.g., mobile device 124 through the cellular phone network 118) and other wireless access terminals using the intelligent softswitch 102.

In general, the intelligent softswitch 102 can provide an integrated software and hardware solution that accommodates the relay of calls from any of a number of types of networks and forward the calls across a same or different network to any of a number of different destinations or devices specified by the subscriber 108. The intelligent softswitch 102 can, in essence, bridge the disparity technologies between, for example, packet-based networks, traditional PSTN communications, and wireless networks to advance lower cost, and high revenue value-added services.

To establish a phone call, the caller 104 can enter instructions by way of a caller device. Depending on the nature of the call (telephone or data), the instructions can include, for example, a specific telephone number, electronic mail address, a sequence of codes, or any other information associated with transmission of the call to the subscriber 108. After completing the dialing instructions, the caller 104 (by way of the caller device) can relay the outbound call containing the instructions to the provider system 106, which can then relay the outbound call to either the intelligent softswitch 102 or transmit the outbound call directly to a receiving device 107 of the subscriber 108. The receiving device 107 of the subscriber 108 can be a mobile telephone, a landline telephone, a computer terminal, or any other communications device.

Where the outbound call is relayed to the intelligent softswitch 102 for processing, the intelligent softswitch 102 can parse the instructions contained in the outbound call to determine the destination address and any other codes needed for connecting the call to the subscriber 108. Based on the information contained in the parsed instructions, the intelligent softswitch 102 can select, for example, a receiving device (or a device with a pre-specified forwarding number) to which the outbound call is routed. Using Voice-over-IP protocol as an example, the intelligent softswitch 102 can determine and provide a destination address (e.g., the IP communications device 122 of the subscriber 108) and an origination address (e.g., the caller's telephone number, an electronic mail address associated with the telephone number, an Internet Protocol address or other information identifying the origin of the outbound call) to an IP gateway associated with the IP communications device of the subscriber 108. The intelligent softswitch 102 can communicate with the Internet gateway to prepare for relaying the outbound call along with call information associated with the call (e.g., caller ID). After identifying the Internet gateway address, the intelligent softswitch 102 can create a link (e.g., a secure link) with the Internet gateway to set up the connection for the call. After establishing the softswitch-to-gateway connection, the caller 104 can be connected to the subscriber 108 using, for example, conventional VoIP techniques to facilitate the call between the caller 104 and the subscriber 108. Once the outbound call is connected, the intelligent softswitch 102 also can transfer the call control to an application programming interface ("API") associated with the IP communications device of the subscriber 108 to handle the remaining call processing and termination.

As an alternative to relaying the outbound call directly to the subscriber 108, the provider system 106 can first relay the outbound call to the intelligent softswitch 102, which then can direct the outbound call to the subscriber's voicemail inbox, and store recorded message associated with the outbound call on either the receiving device of the subscriber 108 and/or in the database 128 that allows the recorded messages to be simultaneously reviewed by the subscriber 108.

In some implementations, upon receiving the relayed call from the provider system 106, the intelligent softswitch 102 can execute one or more instructions to determine whether the intended recipient of the relayed call is a recognized subscriber. For example, the intelligent softswitch 102 can first identify the called number associated with the outbound call. If the called number is associated with the subscriber 108, the intelligent softswitch 102 can be configured to forward the outbound call along with any identifiable and recognizable call identification information (e.g., caller ID of the caller 104) directly to the subscriber 108, either through the provider system 106, or to one of the communications devices (e.g., to either the user terminal 126 or one of the communications devices 120-124) specified by the subscriber 108. The intelligent softswitch 102 also can be programmed to automatically forward calls with unrecognizable caller IDs to the voice mailbox of the subscriber 108.

In some implementations, the intelligent softswitch 102 in conjunction with the control manager 101 can execute one or more instructions associated with determining the identity of the caller 104 for facilitating the means by which the identity of a caller is to be specified. For example, a caller with a blocked caller ID may be required to specify the name of the caller before the call can be switched. As another example, blocked calls can be answered on the first ring, and an announcement or greeting can be played to notify the caller that blocked calls are not accepted and can only be switched once the caller has revealed the caller's identity.

In some implementations, if the intelligent softswitch 102 does not recognize the caller ID of the relayed call, or that the number from which the outbound call is made is not one of the numbers authorized by the subscriber 108, the relayed call can be forwarded to the voice mailbox of the subscriber 108.

While the intelligent softswitch 102 is described in relation to processing outbound calls, the intelligent softswitch 102 also can be configured to receive and process data or messages that can subsequently be routed to the subscriber 108. For example, the intelligent softswitch 102 can be configured to receive a message from the provider and convert the message into one or more data communication messages if necessary (e.g., where the format of the message as originally received is incompatible for an IP network).

As an example, the intelligent softswitch 102 can be configured to convert the message into a SIP message (e.g., in the form of an individual IP data packet) that can be sent or received over an IP network. SIP is an application layer signaling protocol that can be used in, for example, VoIP applications. In particular, SIP is a peer-to-peer protocol developed for initiating, modifying, and terminating an interactive user session on an IP network. Devices connected to the IP network (e.g., communications device 122) can communicate directly with one another using SIP. However, other protocols such as ITU H.323 also can be used in addition to or in lieu of SIP for communication between the intelligent softswitch 102 and other IP network components and devices. Also, SIP messages can be used to identify the subscriber 108 and can designate the type of connection requested (e.g. incoming call, outgoing call and the like). In addition, SIP messages can be used to identify the external called, the calling party and/or any other information desirable for controlling call handling for the subscriber 108.

Figure 2:
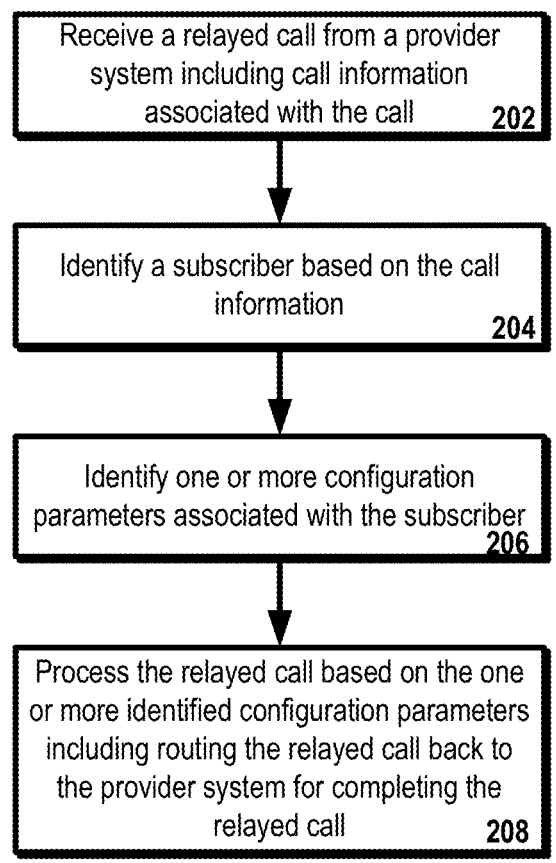
FIG. 2 shows an example of a process for managing a call.

FIG. 2 shows an example of a process 200 for managing a call. The process 200 can be performed, for example, by the call manager 101 and the intelligent softswitch 102, and for clarity of presentation, the description that follows uses the call manager 101 and the intelligent softswitch 102 as the basis of examples for describing the process 200. However, another system or combination of devices and systems also can be used to perform the process 200.

In some implementations, the process 200 can be used to direct an outbound call to a subscriber (e.g., subscriber 108) through a provider system (e.g., provider system 106) and an intelligent softswitch (e.g., intelligent softswitch 102). In some implementations, the provider system can relay the call directly to the subscriber. In some implementations, the provider system 106 can relay the call along with call information associated with the call to the intelligent softswitch 102, which can receive the relayed call, service the relayed call using VoIP techniques, and route the relayed call back to the provider system 106 (e.g., via link 134) for completing the call at the subscriber 108. In some implementations, links 134 and 136 can be coupled to a same or different network. In some implementations, the intelligent softswitch 102 can directly receive an outbound call from the caller 104 or forward the relayed call to the subscriber 108 without needing the call service of the provider system 106.

In some implementations, after receiving and processing the relayed call, the intelligent softswitch 102 also can relay the outbound call to one or more predetermined locations. For example, where the subscriber 108 has previously specified in a pre-provisioned service (e.g., the service hosted by a host that is hosting the softswitch 102) that any outbound call is to be relayed based on one or more call forwarding rules set by the subscriber 108, the intelligent softswitch 102 can forward the outbound call according to the one or more call forwarding rules.

Before forwarding the relayed call to the subscriber 108, in some implementations, the intelligent softswitch 102 can first identify the subscriber 108 as the recipient of the outbound call and determine the call forwarding profile including any existing call forwarding rule associated with the subscriber 108. For example, the intelligent softswitch 102 can determine whether the subscriber 108 has previously specified one or more forwarding numbers and/or locations, or the option to ring sequentially or simultaneously at the one or more specified forwarding numbers and/or locations. As an example, the intelligent softswitch 102 can determine that the subscriber 108 has set up a call profile that identifies a landline number and a softphone with an IP address for receiving outbound calls. Based on the call profile, the intelligent softswitch 102 can process the call and re-direct the call to either or both the landline number and the softphone at the specified IP address.

Referring to FIG. 2, process 200 begins with receiving a call (e.g., an outbound call) from a provider system (202). For example, the provider system 106 can first receive the outbound call or a call request from the caller 104, and service and relay the outbound call or call request to the intelligent softswitch 102 (e.g., using a provider switch of the provider system 106).

In some implementations, the intelligent softswitch 102 can receive the relayed call along with call information associated with the relayed call. Call information associated with the relayed call can include, without limitation, caller name, caller phone number, caller address, date of call, time of call, city/state of origin at time of the call, other caller- and contact-related information, or any combination thereof.

In some implementations, the outbound call can be established by the caller 104 using a mobile device. The mobile device can be a portable communications unit such as, without limitation, a hand-held cellular phone, a communication unit installed in a vehicle, or a fixed-location communications unit (e.g., a landline phone or a softphone initiated through a user terminal). To establish an outbound call, the mobile device can, for example, establish the call over the network 110 (e.g., a wired or wireless network). As an example, the network 110 can include a cellular network, and can communicate with a wide area network (WAN) through a gateway. In some implementations, both voice and data communications originated from the caller 104 can be established over the network 110. For example, the caller 104 can use the mobile device to place and receive phone calls (e.g., using VoIP protocols), send and receive e-mail messages (e.g., using POP3 protocol), and retrieve electronic documents and/or streams, such as web pages, photographs, and videos, over the wireless network, gateway, and wide area network (e.g., using TCP/IP or UDP protocols).

As one example, the process 200 will be explained with respect to the caller making the outbound call using a mobile device. However, other communications devices also can be used, which can include, without limitation, VoIP phones, landline or wireless phones, or any type of communications devices suitable for originating, receiving and participating in communications with other communication devices with the provider system 106 and/or the intelligent softswitch 102. For example, the device used by the caller 104 can be any one of a wired POTS phone (including a cordless phone), a wireless phone (e.g., a cellular phone or other mobile communication device including a telephony-enabled personal digital assistant (PDA)), a VoIP phone, a POTS phone equipped with an analog terminal adapter (ATA), a soft phone (e.g., a computer terminal equipped with telephony software) or a telephony-enabled video unit (e.g., a set-top box connected to a television and a remote control). Further, calls made by the calling device of the caller 104 can be a voice call, a video call, a multimedia call, or any other type of call.

As discussed above, the provider system 106 can receive the outbound call from the caller 104. In some implementations, the provider system, which can be a phone carrier, can include or be coupled to a base transceiver system and a base station controller to receive and process the outbound call. The base station controller can provide control and management of the outbound call, and relay the outbound call to the subscriber 108 using, for example, a circuit switched core network (CSCN) that provides traditional voice communications and/or packet switched core network (PSCN) that provides Internet applications and multimedia services (e.g., through the intelligent softswitch 102). The provider system 106 also can include or be in communication with a mobile switching center (MSC) to provide call switching for traditional voice communications to and from the mobile device used by the caller 104, and can store configuration information to support these capabilities. The MSC can be connected to a base station as well as other public networks such as, for example, a PSTN or an integrated services digital network (ISDN).

In some implementations, the nature of the networks 110 and 112 and the switching/routing scheme employed by the provider system 106 can depend on the nature of the calling device used by the caller 104 and the way in which the call is made. For example, if the caller 104 uses a VoIP phone (or a POTS phone equipped with an ATA) to establish a VoIP call to the subscriber 108, the network 110 can be a data network and the VoIP call can be transmitted to the provider system 106 through this data network. In this example, the networks 110 and 112 can include a digital communications link (e.g., Ethernet) and the provider system 106 can function as a router to route the call to the subscriber 108.

Returning to the process shown in FIG. 2, a subscriber based on the call information can be identified (204). For example, the provider system can identify and forward the call along with call information associated with the call to the intelligent softswitch 102, and based on the call information, the intelligent softswitch 102 can identify the called party as the subscriber 108.

In some implementations, in addition to receiving and transmitting calls from and to the provider system 106, the intelligent softswitch 102 can receive and transmit calls from and to one or more telecommunications networks. Such telecommunications networks can include, for example, a signaling system 7 ("SS7") network, a PBX network, a SIP network or a VoIP network. In this example, the intelligent softswitch 102 can transmit or receive calls from ISDN phones connected to the PBX network. As another example, the intelligent softswitch 102 can transmit or receive calls from SIP phones connected to the SIP network (where an SIP proxy also can be used to serve as an intermediary between SIP network and the SIP phones). The SIP network can include a media gateway to support transmission of the actual voice or data signal between the SIP network and the intelligent softswitch 102. The intelligent softswitch 102 can communicate with the IP communications device 122 (or any softphone) using SIP messaging to establish communication sessions through the IP network 116 so as to accommodate VoIP phone calls between the intelligent softswitch 102 and the IP communications device 122 (or softphone) using IP data packets.

In sum, when the caller 104 initiates a call request to place an outbound call, the provider system 106 can receive the call request, and determine the identifier of the destination (e.g., the subscriber's telephone number) as well as the identifier of the calling device (e.g., the telephone number through which the call originates) from the call request. The intelligent softswitch 102 coupled to the provider system 106 can include switching functionalities operable to examine the identifier of the destination and to determine (e.g., by accessing the database 128) the corresponding party being called. For example, based on the caller identification, the intelligent softswitch 102 can determine that the subscriber 108 is the intended recipient of the call.

One or more configuration parameters associated with the subscriber can be identified (206). In some implementations, the one or more configuration parameters can be associated with one or more calling handling rules configured to aid in processing the call. For example, the intelligent softswitch 102 can interact with the provider system 106 and the database 128 in order to effect various call processing operations upon receiving an incoming call, or when originating an outgoing call, or otherwise participating in a call in progress.

Based on the one or more identified configuration parameters, the call can be processed (208). In some implementations, where one or more call handling rules have been specified, the intelligent softswitch 102 can process an outgoing call intended for the subscriber 108 in accordance with the one or more calling handling rules. In some implementations, such rules can include, but are not limited to, rules pertaining to features such as call blocking, call forwarding, call screening, privacy director (PD), do not disturb (DND), call waiting, call conferencing, call holding, speed dialing, and other rules. Each rule can be defined, for example, by a condition, an operation to be performed if the condition is satisfied for a given call, and an operation to be performed if the condition is not satisfied for a given call. For a given rule, the condition can be defined in terms of one or more characteristics of the call. Examples of characteristics of a call can include, without limitation, the origin (e.g., which can be expressed, for instance, as a telephone number and/or other identifier (e.g., an IP address or SIP identifier) associated with a communication device from which the call originates), its intended destination or recipient (e.g., which can be expressed, for instance, as a telephone number and/or other identifier (e.g., an IP address or SIP identifier) associated with a communication device for which the call is destined), a time at which it was originated (e.g., a date, hour, minute, and the like), and other characteristics. For a given rule, the calling handling operations to be performed based on whether the condition is satisfied can also depend on the nature of the given rule (e.g., route a call to its intended destination, forward a call in accordance with a call forwarding rule, direct a call to the subscriber's voicemail and the like). The intelligent softswitch 102 can include suitable hardware, firmware, software, control logic, or a combination thereof for implementing its call handling functionality.

In some implementations, the intelligent softswitch 102 can determine whether one or more forwarding rules have been specified by the subscriber 108. Where one or more forwarding rules have been specified, the intelligent softswitch 102 can further determine if the subscriber 108 has specified a time associated with the one or more forwarding rules. For example, the intelligent softswitch 102 can determine whether the subscriber 108 has specified a "Business Hours" schedule during which calls made during business hours to the subscriber 108 can be forwarded to, for example, the office number associated with the subscriber 108. Similarly, the intelligent softswitch 102 can determine whether the subscriber 108 has specified a "After Hours" schedule during which calls made after business hours to the subscriber 108 can be forwarded to, for example, the home number associated with the subscriber 108.

As another example, if the intelligent softswitch 102 determines that the time of the call is after a particular designated time period, the intelligent softswitch 102 can forward the call to, for example, the IP phone 122 associated with the subscriber 108. To configure (e.g., add, delete or modify) one or more call handling rules such as call forwarding rules, the subscriber 108 can, for example, access a web-based or mobile-based interface provided by, for example, the host hosting network services associated with the intelligent softswitch 102 and subscribed to by the subscriber 108.

In some implementations, each forwarding rule can include one or more types of forwarding numbers, such as a forwarding number associated with a mobile device, a forwarding number associated with a "Home" device or a forwarding number associated with an office phone. For example, the intelligent softswitch 102 can identify the called number associated with the call placed by the caller 104 as the number associated with the subscriber 108. With the subscriber 108 being identified as the recipient of the call, the intelligent softswitch 102 can determine the one or more forwarding rules associated with the subscriber 108, identify one or more forwarding rules that are active, and execute the one or more active forwarding rules in processing the pending call. For example, the intelligent softswitch 102 can forward the call to the user terminal 126, to the subscriber 108 (e.g., through the provider system 106), to the PSTN communications device 120 coupled to the PSTN 114 (e.g., through an underlying carrier coupled to the PSTN 114), to an IP network communications device 122 coupled to the IP network 116, and/or to the voicemail associated with the subscriber 108.

In some implementations, the forwarding numbers specified in the forwarding rules can be configured to ring sequentially or simultaneously when the caller 104 places a call to the subscriber 108. For example, the subscriber 108 can establish a call forwarding setting to allow communications devices 120-124 associated with the call forwarding numbers specified by the subscriber 108 to ring sequentially based on the order in which the call forwarding numbers are listed. As another example, the subscriber 108 can establish a call forwarding setting to allow communications devices 120-124 associated with the call forwarding numbers to ring simultaneously so that the communications devices 120-124 can be simultaneously rung at the time of receiving an the routed relayed call from the provider system 106. In sum, the mobile device of the subscriber 108 at which the call from the caller is received and the communications devices 120-124 to which the call is relayed can be configured to ring sequentially or simultaneously. More detail regarding the configuration of call handling rules such as call forwarding rules can be found in, for example, U.S. Provisional Application No. 61/259,505, filed Nov. 9, 2009, entitled "CALL MANAGEMENT INTERFACES", the disclosure of which is incorporated herein by reference in its entirety.

In some implementations, after the call has been processed, the call can be relayed back to the provider system 106 for completing the call. For example, the intelligent softswitch 102 can process the relayed call from the provider system 106, forward the relayed call to one or more communications devices (e.g., IP phone 122), and route the relayed call back to the provider system 106. In some implementations, upon receiving the relayed call from the intelligent softswitch 102, the provider system 106 can complete the connection of the outbound call to the subscriber 108 (e.g., by connecting the outbound call to the mobile phone or other receiving device 107 associated with the subscriber 108). By relaying the outbound call initiated by the caller 104 to the intelligent softswitch 102 and routing the relayed call back to the provider system 106, only a single cell phone number or other phone number) is needed to forward the call to, for example, a mobile phone (or other receiving device 107) of the subscriber 108 and to the VoIP device associated with the subscriber 108 (e.g., a IP phone or user terminal possessing VoIP capability). Thus, the subscriber 108 can be reached by the caller 104 at the receiving device 107 or the communications devices 120-126 with a single phone number.

Operations 202-208 can be performed in the order listed, in parallel (e.g., by the same or a different process, substantially or otherwise non-serially), or in reverse order to achieve the same result. In other implementations, operations 202-208 can be performed out of the order shown.

While the process 200 is described with respect to processing an outgoing call from the caller 104 to the subscriber 108, the process 200 also is applicable to placing a call by the subscriber 108 to the caller 104. Similarly, process 200 is applicable to placing a call from one of the communications devices 120-124 to either the caller 104 or the subscriber 108.

Further, in some implementations, the provider system 106 can be omitted. In these implementations, the intelligent softswitch 102 can directly receive the outgoing call from the caller 104 through an established link 132 and process the call in accordance with the existing call handling rules.

While the descriptions provided herein pertain to receiving and processing a call, it should be appreciated that the subject matter described herein also is applicable to sending and receiving messages (e.g., SMS or MMS message), multimedia communications and other content. Accordingly, although the present description refers to placing a call, as used herein, the term "call" also can include telephone calls, SMS messages, any other form of text messages, video messages, as well as any other type of telephony action or content transfer that can be initiated by the caller 104.

Example Device Implementation

Figure 3:
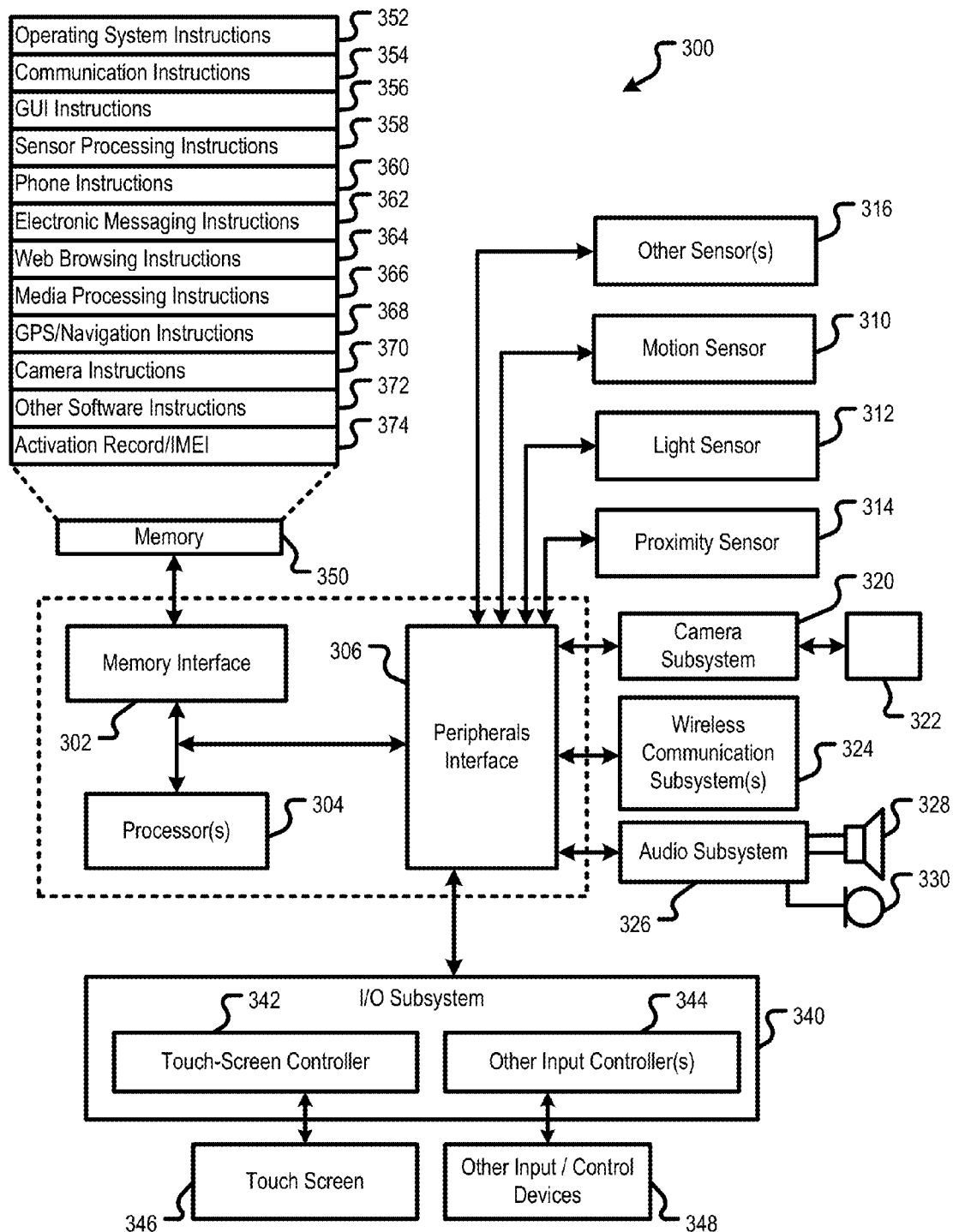
FIG. 3 is a block diagram of an example architecture of a communications device.

FIG. 3 is a block diagram of an example architecture 300 of a communications device. In some implementations, the communication device can be a mobile device, or any communications device used in the telecommunication network 100.

Referring to FIG. 3, the communications device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the communications device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the communications device is intended to operate. For example, a communications device can include communication subsystems 324 designed to operate over a GSM network, a GPRS network, an EDGE network, a Wi-Fi or WiMax network, and a Bluetooth™ network. In particular, the wireless communication subsystem 324 can include hosting protocols such that the communications device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, the pressing of a button for a first duration can disengage a lock of the touch screen 346; and the pressing of the same or different button for a second duration that is longer than the first duration can turn power to the communications device on or off. The user can customize a functionality of one or more of the buttons. The touch screen 346 can, for example, also be used to implement virtual or soft buttons and/or a keyboard.

In some implementations, the communications device can present recorded audio and/or video files, such as MP3, AAC, and MPEG files. In some implementations, the communications device can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the communications device can be implemented in hardware and/or in software, including in one or more signal processing and/or application specific integrated circuits.

Computer Devices

Figure 4:
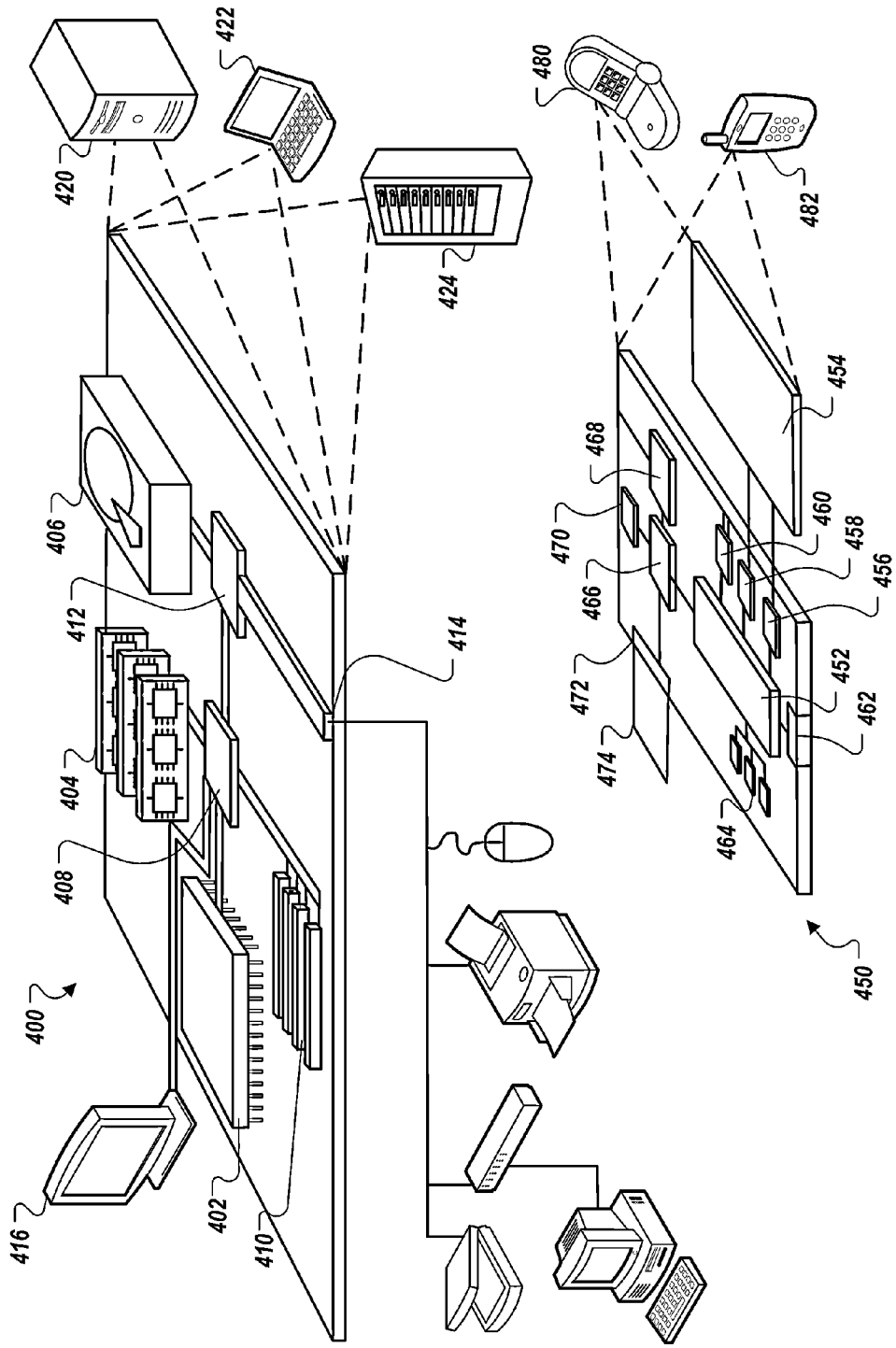
FIG. 4 is a block diagram of two computing devices that can be used to implement processes and methods described in relation to the telecommunication network shown in FIG. 1.

FIG. 4 is a block diagram of computing devices 400, 450 that may be used to implement the systems and methods described in this document, as either a calling device or receiving device. Computing device 400 can represent various forms of digital computers, such as laptops, desktops, workstations, personal digital assistants, servers, blade servers, mainframes, and other appropriate computers (e.g., user terminal 126). Computing device 450 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

As shown in FIG. 4, computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 1270 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method comprising:

receiving a first relayed call from a provider system including first call information associated with the first relayed call, wherein the first call information includes a first time that the first relayed call was originated and first identification information describing a caller placing the first relayed call;

identifying a subscriber based on the call information;

identifying one or more configuration parameters associated with the subscriber, wherein identifying the one or more configuration parameters includes identifying one or more handling parameters and one or more time-based parameters, wherein the handling parameters define handling rules for handling calls intended for the subscriber based on identification information describing callers placing the calls, and wherein the time-based parameters define time-based rules for handling calls intended for the subscriber based on times that the calls were originated;

processing the first relayed call based on the one or more identified handling parameters, the one or more identified time-based parameters, the first time that the first relayed call was originated, and the first identification information describing the first caller placing the first relayed call, wherein processing the first relayed call comprises:

determining that the first caller placing the first relayed call has been authorized by the subscriber, determining that the first time that the first relayed call was originated is in a first time window, and routing the call based on a first handling rule for handling calls placed by callers that have been authorized by the subscriber and a first time-based rule for handling calls originated during the first time window;

receiving a second relayed call from the provider including second call information associated with the second relayed call, wherein the second call information associated with the second relayed call includes second identification information describing a second caller placing the second relayed call; and processing the second relayed call based at least in part on the one or more identified handling parameters and the second identification information describing the second caller placing the second relayed call, wherein processing the second relayed call comprises:

determining from the second identification information that an identity of the second caller placing the second relayed call is blocked, and processing the second relayed call based at least in part on a second handling rule for handling relayed calls from callers having blocked identities, wherein the second handling rule specifies that callers having blocked identities should be prompted to reveal their identity before calls placed by the callers having blocked identities are processed.

2. The method of claim 1, wherein identifying the one or more time-based parameters includes identifying one or more call forwarding rules each associated with a respective time window.

3. The method of claim 2, wherein identifying one or more call forwarding rules includes identifying one or more forwarding numbers each associated with a forwarding device.

4. The method of claim 3, wherein processing the first relayed call includes forwarding the first relayed call to the forwarding device.

5. The method of claim 1, wherein receiving the first relayed call includes receiving an outbound call from the first caller intended for the subscriber.

6. The method of claim 1, wherein the first call information includes a dialed number served by the provider system.

7. The method of claim 6, wherein the dialed number is assigned to a receiving device associated with the subscriber, and wherein processing the first relayed call includes forwarding the first relayed call to a forwarding device associated with the subscriber.

8. The method of claim 1, wherein processing the first relayed call includes servicing the first relayed call to the subscriber over a Voice-over-Internet-Protocol (VoIP) network.

9. The method of claim 1, wherein processing the first relayed call includes forwarding the first relayed call directly from the provider system to a non-VoIP receiving device associated with the subscriber.

10. The method of claim 1, wherein processing the first relayed call includes forwarding the first relayed call to one or more VoIP or non-VoIP communications devices associated with the subscriber using a same number at which the first relayed call is received.

11. The method of claim 1, wherein the second handling rule specifies that calls from callers having a blocked identity be forwarded to a voice mailbox of the subscriber if the callers do not reveal their identity when prompted.

12. The method of claim 1, further comprising receiving a third relayed call from the provider including third call information associated with the third relayed call, wherein the third call information associated with the third relayed call includes third identification information describing a third caller placing the third relayed call, wherein the third identification information describing the caller placing the third relayed call identifies that the third caller is not a caller that has been authorized by the subscriber, and wherein the one or more handling parameters include a parameter specifying that calls from callers that have not been authorized by the subscriber be forwarded to a voice mailbox of the subscriber.

13. A database for storing one or more configuration profiles; and a call control manager for receiving a first relayed call and a second relayed call from a provider system, the call control manager including a softswitch operable to:

identify first call information associated with the first relayed call, wherein the first call information includes a first time that the first relayed call was originated and first identification information describing a first caller placing the first relayed call;

identify a subscriber based on the first call information;

identify a configuration profile associated with the subscriber;

process the first relayed call in accordance with the configuration profile including:

identifying one or more configuration parameters from the configuration profile, including identifying one or more handling parameters and one or more time-based parameters, wherein the handling parameters define rules for handling calls intended for the subscriber based on identification information describing callers placing the calls, and wherein the time-based parameters define time-based rules for handling calls intended for the subscriber based on times that the calls were originated and processing the first relayed call in accordance with the one or more handling parameters, the one or more time-based parameters, the time that the first relayed call was originated, and the information describing the first caller placing the first relayed call, comprising:

determining that the first caller placing the first relayed call has been authorized by the subscriber;

determining that the time that the first relayed call was originated is in a first time window; and selecting a first handling rule for handling calls placed by callers that have been authorized by the subscriber and a first time-based rule for handling calls originated during the first time window;

route the first relayed call back to the provider system for completing the first relayed call in accordance with the first handling rule and the first time-based rule; and identify second call information associated with the second relayed call, wherein the second call information associated with the second relayed call includes second identification information describing a second caller placing the second relayed call;

identify the subscriber based on the second call information;

process the second relayed call in accordance with the configuration profile associated with the subscriber including:

processing the second relayed call in accordance with the one or more identified handling parameters and the second identification information describing the second caller placing the second relayed call, comprising:

determining from the second identification information that an identity of the second caller placing the second relayed call is blocked, and selecting a second handling rule for handling relayed calls from callers having blocked identities, wherein the second handling rule specifies that callers having blocked identities should be prompted to reveal their identity before calls placed by the callers having blocked identities are processed; and route the second relayed call back to the provider system for completing the second relayed call in accordance with the second handling rule.

14. The system of claim 13, wherein the time-based parameters define one or more call forwarding rules each associated with a respective time window; and wherein the softswitch is configured to forward the first relayed call to one or more communications devices associated with the subscriber based on the one or more call forwarding rules.

15. The system of claim 14, wherein the softswitch is configured to identify one or more forwarding numbers from the one or more call forwarding rules, each forwarding number associated with a forwarding device.

16. The system of claim 15, wherein the softswitch is configured to forward the first relayed call to the forwarding device identified from a call forwarding rule associated with the first time window.

17. The system of claim 16, wherein the first relayed call is forwarded to the forwarding device over a VoIP network.

18. The system of claim 13, wherein the first relayed call is forwarded directly from the provider system to a receiving device associated with the subscriber.

19. The system of claim 18, wherein the softswitch is configured to forward the first relayed call to one or more communications devices associated with the subscriber using a same number at which the first relayed call is received.

20. The system of claim 19, wherein the receiving device is configured to ring sequentially or simultaneously upon receiving the routed first relayed call as the one or more communications devices receiving the first relayed call.

21. The system of claim 13, wherein the first call information includes a dialed number served by the provider system and assigned to a receiving device associated with the subscriber, and where the softswitch is configured to forward the first relayed call to a forwarding device associated with the subscriber.

22. A device comprising:
a softswitch operable to:
identify first call information associated with a first relayed call, wherein the first call information includes a first time that the first relayed call was originated and first identification information describing a caller placing the first relayed call;

identify a subscriber based on the first call information;

identify a configuration profile associated with the subscriber;

process the first relayed call in accordance with the configuration profile including:

identifying one or more configuration parameters, wherein identifying the one or more configuration parameters includes identifying one or more handling parameters and one or more time-based parameters, wherein the handling parameters define rules for handling calls based on identification information describing callers placing the calls, and wherein the time-based parameters define time-based rules for handling calls intended for the subscriber based on times that the calls were originated, and processing the first relayed call in accordance with the one or more handling parameters, the one or more time-based parameters, the first time the first relayed call was originated, and the first information describing the first caller placing the relayed call, comprising:

determining that the first caller placing the first relayed call has been authorized by the subscriber;

determining that first time that the first relayed call was originated is in a first time window; and selecting a first handling rule for handling calls placed by callers that have been authorized by the subscriber and a first time-based rule for handling calls originated during the first time window;

route the first relayed call back to a provider system for completing the first relayed call in accordance with the first handling rule and the first time-based rule; and identify second call information associated with the second relayed call, wherein the second call information associated with the second relayed call includes second identification information describing a second caller placing the second relayed call;

identify the subscriber based on the second call information;

process the second relayed call in accordance with the configuration profile associated with the subscriber including:

processing the second relayed call in accordance with the one or more identified handling parameters and the second identification information describing the second caller placing the second relayed call, comprising:

determining from the second identification information that an identity of the second caller placing the second relayed call is blocked, and selecting a second handling rule for handling relayed calls from callers having blocked identities, wherein the second handling rule specifies that callers having blocked identities should be prompted to reveal their identity before calls placed by the callers having blocked identities are processed; and route the second relayed call back to the provider system for completing the second relayed call in accordance with the second handling rule.

23. The device of claim 22, wherein the time-based parameters define one or more call forwarding rules each associated with a respective time window; and wherein the provider system is configured to forward the first relayed call to one or more communications devices associated with the subscriber based on the one or more call forwarding rules.

24. The device of claim 23, wherein the softswitch is configured to identify one or more forwarding numbers from the one or more call forwarding rules, each forwarding number associated with a forwarding device.

25. The device of claim 24, wherein the softswitch is configured to forward the first relayed call to the forwarding device identified from a call forwarding rule associated with the first time window.

26. The device of claim 22, wherein the call information includes a dialed number served by the third party device and assigned to a receiving device associated with the subscriber, and where the provider system is configured to forward the first relayed call to a forwarding device associated with the subscriber.

* * * * *

UNITED STATES PATENT AND TRADEMARK OFFICE
CERTIFICATE OF CORRECTION

| | | |
|---|---|---|
| PATENT NO. | : 8,644,485 B1 | |
| APPLICATION NO. | : 12/939916 | |
| DATED | : February 4, 2014 | |
| INVENTOR(S) | : Vlad Vendrow and Vladimir Shmunis | |

It is certified that error appears in the above-identified patent and that said Letters Patent is hereby corrected as shown below:

On the Title Page, Item (54) and in the Specification, Column 1, line 1, please amend the title from "INTELLIGENT SOFTSWITCH FOR MANAGING A CALL" to --INTELLIGENT SOFTSWITCH--.

Signed and Sealed this
Twenty-fourth Day of June, 2014

Michelle K. Lee
*Deputy Director of the United States Patent and Trademark Office*